United States Patent [19]

Gallasch

[11] 4,303,220
[45] Dec. 1, 1981

[54] FOUNDATION FOR A VIBRATING MACHINE

[75] Inventor: Hubert Gallasch, Mannheim, Fed. Rep. of Germany

[73] Assignee: BBC Brown, Boveri & Company, Limited, Baden, Switzerland

[21] Appl. No.: 135,109

[22] Filed: Mar. 28, 1980

[30] Foreign Application Priority Data

Apr. 9, 1979 [DE] Fed. Rep. of Germany ....... 2914251

[51] Int. Cl.³ .......................... F16M 1/00; F16M 3/00; F16M 5/00; F16M 9/00
[52] U.S. Cl. ....................................... 248/679; 52/250
[58] Field of Search .............. 248/676, 678, 679, 346; 52/250, 299

[56] References Cited

U.S. PATENT DOCUMENTS

| | | | |
|---|---|---|---|
| 3,423,891 | 1/1969 | Burris | 52/250 |
| 3,683,576 | 8/1972 | Sikes | 52/250 |
| 3,698,147 | 10/1972 | Sikes | 52/250 |
| 4,191,356 | 3/1980 | Ashmun et al. | 248/678 |

FOREIGN PATENT DOCUMENTS 494237 3/1976 U.S.S.R. ............................. 248/678

Primary Examiner—Wayne L. Shedd
Attorney, Agent, or Firm—Burns, Doane, Swecker & Mathis

[57] ABSTRACT

A foundation for a vibrating machine is disclosed. The foundation includes a frame-like stage plate made from longitudinally aligned girders and transversely aligned beams. The girders and beams are hollow and have cross-sections which are dimensioned so that an axial moment of inertia relative to a bending axis of each of the girders and beams is at least three times the value required to ensure the ability of the stage plate to support a given load. As a consequence a natural frequency of the vibration system, which system includes the vibrating machine and the foundation, closest to the operating speed of the vibrating machine differs from the operating speed of the machine by at least fifteen percent of the operating speed of the machine.

9 Claims, 2 Drawing Figures

FOUNDATION FOR A VIBRATING MACHINE

BACKGROUND AND SUMMARY OF THE PRESENT INVENTION

The invention disclosed herein pertains generally to a foundation for a vibrating machine, such as a turbomachine, and more particularly to a low frequency tuned foundation.

In order to make a machine subjected to vibration as vibration-proof as possible, it is necessary that the eigenfrequencies or natural frequencies of the vibration system, which system includes the machine and the stage plate on which the machine is mounted, be different by a sufficiently safe interval from an excitation frequency defined by the operating speed of the machine. If the fundamental frequency of the vibration system is below the operating speed of the machine, then the foundation is called a low-tuned foundation. If the natural frequencies of the vibration system are above the operating speed of the machine, then the foundation is called a high-tuned foundation.

The difference between the natural frequency of the stage plate closest to the operating speed of the machine and the operating speed of the machine should be at least 15% of the operating speed. This safety interval is necessary because the vibration system computations underlying the present invention are based on an idealized mass system and because the assumed load data contains inaccuracies. Furthermore, a precise computation based on the exact cross-sectional configurations of the girders and beams of the stage plate is almost impossible and thus the present computation is based on simplified cross-sectional configurations. As a result, it has been found in practice that the actual natural frequencies of a vibration system can differ from the theoretically computed values by as much as 10%.

The problems involved in modeling a vibration system make it difficult to design foundations for vibrating machines. If standard girders and beams having solid cross-sections were to be used in the foundation of a turbomachine, then this would result in a close sequence of the natural frequencies of the vibration system, the interval between the natural frequencies being approximately 3 to 5 cps within the region of the operating speed of the machine. The required safe interval of at least 15% from the operating speed of the machine, which operating speed is usually between 50 and 60 rps, could therefore not be accomplished in practice.

Accordingly, a primary object of the present invention is to provide a foundation for a machine subjected to vibration such that the interval between successive natural frequencies of the vibration system, which system includes the machine and the foundation, is increased and a safe interval of approximately 15% between the operating speed of the machine and the nearest natural frequency of the vibration system is achieved.

Yet another object of the present invention is to provide a foundation which is of simple construction so that it can be economically manufactured.

A foundation for a vibrating machine, according to the present invention, includes two vertical supports which rest on the ground and which extend vertically upwardly from the ground. A bearing element is mounted on each of the vertical supports, and two resilient, spring-like elements are mounted on each of the bearing elements. Mounted on top of the resilient, spring-like elements is a stage plate on which is mounted a vibrating machine, such as a turbomachine.

The stage plate of the present invention includes a frame-like structure made from longitudinally aligned girders and transversely aligned beams, which girders and beams are made from hollowed-out concrete. These hollow girders and beams have rectangular cross-sections which are dimensioned so that an axial moment of inertia relative to a horizontal bending axis of each of the girders and beams is at least three times the value required to ensure stability of the stage plate.

The present invention is advantageous because the hollow girders and beams of the stage plate have a very high bending resistance and thus the stage plate has a high bending resistance. In addition, by using hollow girders and beams the number of eigenfrequencies or natural frequencies of the vibration system of the present invention is reduced in comparison with a vibration system wherein the stage plate utilizes girders and beams made of solid concrete. Because the number of natural frequencies has been reduced, it follows that the interval between the natural frequencies of the vibration system of the present invention has been increased. Thus, these frequencies can be set so that the required safety interval from the frequency of excitation, that is, the operating speed of the machine, can be maintained. For purposes of comparison, a foundation and stage plate having girders and beams made from solid concrete possesses an interval between the natural frequencies of approximately 3 to 5 cps. The present invention, on the other hand, has an interval between the natural frequencies of approximately 15 cps (within the region of the operating speed of the machine) so that a safe interval of 15% relative to the operating speed of the machine is possible.

Details concerning the specific dimensions and design of the hollow girders and beams of the present invention are not provided herein because the disclosure contained herein is sufficient to enable one of ordinary skill to select appropriate dimensions for the hollow girders and beams. Preferably, these dimensions should be chosen so that the operating speed of the machine lies approximately in the middle of two successive natural frequencies of the vibration system.

In a preferred embodiment of the present invention, the hollow spaces in the hollow girders and beams of the stage plate extend substantially throughout the entire length of the girders and beams.

In yet another preferred embodiment of the present invention bulkheads or stiffening partitions are used to interconnect the hollow spaces in the girders and beams at the points of juncture of the girders and beams. These bulkheads are used to increase the torsional strength of the stage plate of the present invention at these points of juncture.

In order to provide for communication between the spaces in the hollow girders and beams and in order to utilize these spaces for the installation of pipe lines, still another preferred embodiment of the present invention includes openings or passages in the bulkheads.

BRIEF DESCRIPTION OF THE DRAWINGS

A preferred embodiment of a foundation for a vibrating machine, according to the present invention, is described with reference to the accompanying drawings wherein like members bear like reference numerals, and wherein.

DETAILED DESCRIPTION OF THE PREFERRED EMBODIMENT

Figure 1:
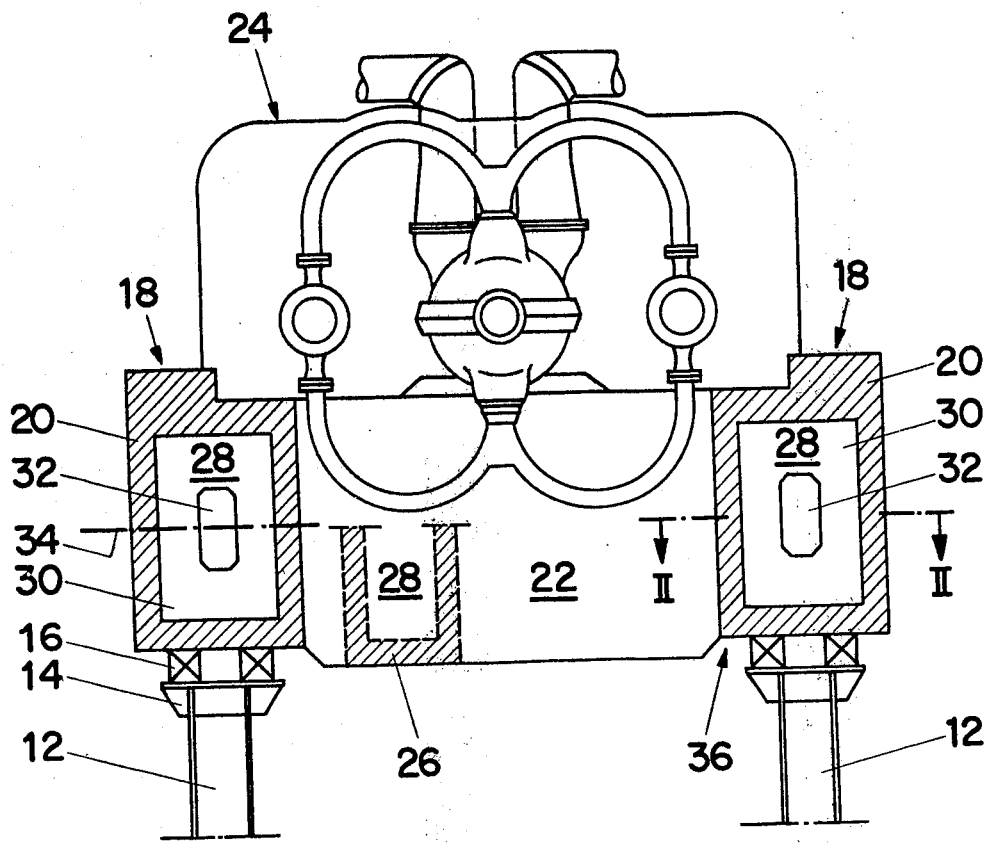
FIG. 1 is a vertical cross-sectional view of a preferred embodiment of a foundation for a turbomachine, according to the present invention.

With reference to FIG. 1, a preferred embodiment of a foundation for a vibrating machine, such as a turbomachine, according to the present invention, includes two vertical supports 12 which extend vertically upwardly from the ground. A bearing 14 is mounted on the upper end of each of the vertical supports 12, and each bearing element 14 carries two resilient, spring-like elements 16. A stage plate 18 rests on the spring-like elements 16, and a turbomachine 24 is mounted on the stage plate 18. It is to be noted that the stage plate 18 may be mounted directly on the supports 12, without using the spring-like elements 16.

The stage plate 18 includes longitudinally aligned girders 20 and beams 22, aligned transversely with respect to the girders 20, forming a frame-like structure. The number of beams 22 can vary depending on the specific requirements of the situation. FIG. 1 illustrates only one transversely aligned beam 22 because this beam is located in a plane parallel to the plane of the cross-sectional view shown in FIG. 1. A cross-section 26 of the transversely aligned beam 22 is shown in FIG. 1.

The girders and beams 20, 22 have cross-sections which are substantially rectangular. The girders and beams 20, 22 also have hollow spaces 28 which extend substantially the entire length of the girders and beams. Since the girders and beams 20, 22 are preferably hollow box girders, the hollow spaces 28 likewise have substantially rectangular cross-sections as is shown in FIG. 1. The hollow spaces 28 of the longitudinally aligned girders 20 and transversely aligned beams 22 are in communication with one another at their points of intersection so that there exists inside the stage plate 18 an interconnected system of hollow spaces within which pipe lines and/or auxiliary devices can be arranged.

Figure 2:
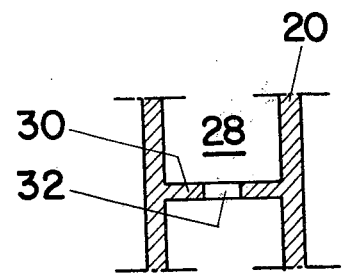
FIG. 2 is a cross-sectional view of the embodiment shown in FIG. 1 taken on the line II—II of FIG. 1.

With reference to FIG. 2 as well as FIG. 1, the girders and beams 20, 22 are provided with stiffening bulkheads or partitions 30 which are arranged within the hollow spaces 28. Each of the bulkheads is arranged at a substantially right angle to the longitudinal axis of the respective girder or beam. The bulkheads 30 are particularly used at points under high stress. These stiffening bulkheads or partitions 30, each of which forms one single piece with its respective girder or beam, serve to reinforce the stage plate 18 at those points where the girders and beams intersect one another. In order to ensure the interconnection of the hollow space system of the stage plate, the stiffening partitions 30 are designed in the form of disks, each of which includes an opening or passage 32. The stiffening partitions in the hollow spaces 28 have a thickness which is approximately equal to the wall thickness of the girders or beams.

With reference again to FIG. 1, the longitudinally aligned girders 20 and transversely aligned beams 22 are made of reinforced concrete. The cross-sections of the girders and beams 20, 22 are selected so that, while still retaining sufficient torsional strength, each girder or beam has an axial moment of inertia about its corresponding horizontal bending axis 34 which is at least three times the moment of inertia that would normally be necessary under a given load. In order to hold construction costs within reasonable limits, it is not necessary to go beyond a six-fold increase in the moment of inertia. It is to be noted that it is possible to design the cross-sections of the transversely aligned beams 22 differently from one another and/or differently from the cross-sections of the longitudinally aligned girders 20, depending on the frequency setting necessary. As shown in FIG. 1, the cross section 26 of the beam 22 is different from the cross-section of the girders 20.

As an example of how the present invention may be used in practice a foundation, according to the present invention, for a 440 Mw turbine operating at a speed of 50 rps, will have adjacent natural frequencies of 42.5 cps and 57.5 cps. Both of these natural frequencies differ from the speed of the turbine by the requisite 15% of the speed of the turbine.

An advantage of the hollow box girder and beam system used in the present invention is the possibility of detuning the natural frequencies of a foundation, according to the present invention, by inserting loads within the hollow spaces 28.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A foundation for a vibrating machine, comprising:
   a frame-like stage plate which includes girders and beams, said beams extending transversely with respect to said girders;
   each of said girders and beams having a hollow interior, and each of said girders and beams having a moment of inertia relative to a bending axis which is at least three times the moment of inertia required for said stage plate to support a given load.

2. The foundation according to claim 1 wherein said cross-section is substantially rectangular.

3. The foundation according to claim 1 wherein said girders and beams are made from reinforced concrete.

4. The foundation according to claim 1 wherein said hollow interior in each of said girders and beams extends substantially throughout the length of each of said girders and beams.

5. The foundation according to claim 1 wherein said girders and beams are hollow box girders and beams.

6. The foundation according to claim 4 wherein said hollow interior of a girder is in communication with said hollow interior of a beam at a point of juncture of said girder and said beam.

7. The foundation according to claim 4 wherein at least one stiffening bulkhead is arranged within the hollow interior in each of said girders and beams.

8. The foundation according to claim 6 wherein a first stiffening bulkhead is arranged within said hollow interior of said girder and a second stiffening bulkhead is arranged within said hollow interior of said beam, said first and second bulkheads being arranged adjacent said point of juncture.

9. The foundation according to claim 8 wherein each of said first and second bulkheads includes an opening whereby said hollow interior of said girder may communicate with said hollow interior of said beam.

* * * * *